United States Patent [19]

Ottelli

[11] Patent Number: 5,299,593
[45] Date of Patent: Apr. 5, 1994

[54] MIXER VALVE FOR HOT AND COLD WATER INCORPORATING A PRESSURE BALANCER

[75] Inventor: Giordano Ottelli, Lumezzane S.S., Italy

[73] Assignee: SOL S.p.A., Brescia, Italy

[21] Appl. No.: 922,811

[22] Filed: Jul. 31, 1992

[51] Int. Cl.[5] .......................................... F16K 11/065
[52] U.S. Cl. ................................................... 137/100
[58] Field of Search ...................... 137/98, 100, 625.17

[56] References Cited

U.S. PATENT DOCUMENTS 2,987,070 6/1961 Fraser .................................. 137/100
3,192,939 7/1965 Moen .................................. 137/100
4,095,610 6/1978 Priesmeyer ........................ 137/100

Primary Examiner—Robert G. Nilson
Attorney, Agent, or Firm—McGlew and Tuttle

[57] ABSTRACT

The invention relates to a mixer valve for hot and cold water having a cartridge-type body 10 with a rise 16 which is integral to the base 11 of its body and the rise having a slot 17 for holding a pressure balancer 18. The slot has passages for the inlet of water to the balancer and passages for the outlet of water from the balancer towards the plate-type mixer unit inside the body, the water coming out of the mixer unit and going towards the delivery mouth passing on outside and around the slot.

9 Claims, 2 Drawing Sheets

MIXER VALVE FOR HOT AND COLD WATER INCORPORATING A PRESSURE BALANCER

FIELD OF THE INVENTION

The present invention relates to hot and cold water mixer valves in sanitary units.

BACKGROUND OF THE INVENTION

These mixer valves usually have a cartridge-type body with a base and a lid and incorporate a mixer unit made up from two overlapping ceramic plates. One plate is fixed to the base of the body. The other plate is controlled from the outside and is movable on and with respect to the fixed one. The fixed plate has two water inlet holes which connect with two conduits for the separate supplying of hot and cold water and one hole for the outlet of water towards the delivery mouth of the tap to which the valve is fitted. As far as the mobile plate is concerned it is movable through a control lever and has a mixing chamber which selectively joins one or both the water inlet holes with the outlet one.

It has already been proposed that the mixer valves are to be fitted with a pressure balancer on a side having the water inlet holes of the fixed plate. The pressure balancer having a known structure which is suitable for compensating the variations of the pressure of water coming from a distribution network and which prevents the flow from surging, therefore keeping the ratio of the capacity of the two types of water constant.

At present the application of such a balancer requires the availability and the inserting of a suitable casing which is to connect to the body of the valve and which is designed to hold the balancer.

SUMMARY AND OBJECTS OF THE INVENTION

The aim of the present invention is to supply a mixer valve with a body which is configured to render the fitting of a balancer simpler and more practical.

Another aim of the invention is to supply a mixer valve where the application of the balancer can be carried out without having to pre-arrange and insert added elements which always constitute sources of complications for both the assembly operations and for the resulting structure of the article as a whole.

To this end, the here proposed mixer valve is characterized with a body having a rise which is integral with its base. The rise having a slot for holding a balancer and having passages for the inlet of water to the balancer and passages for the outlet of water from the balancer towards the plate-type mixer unit inside the body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
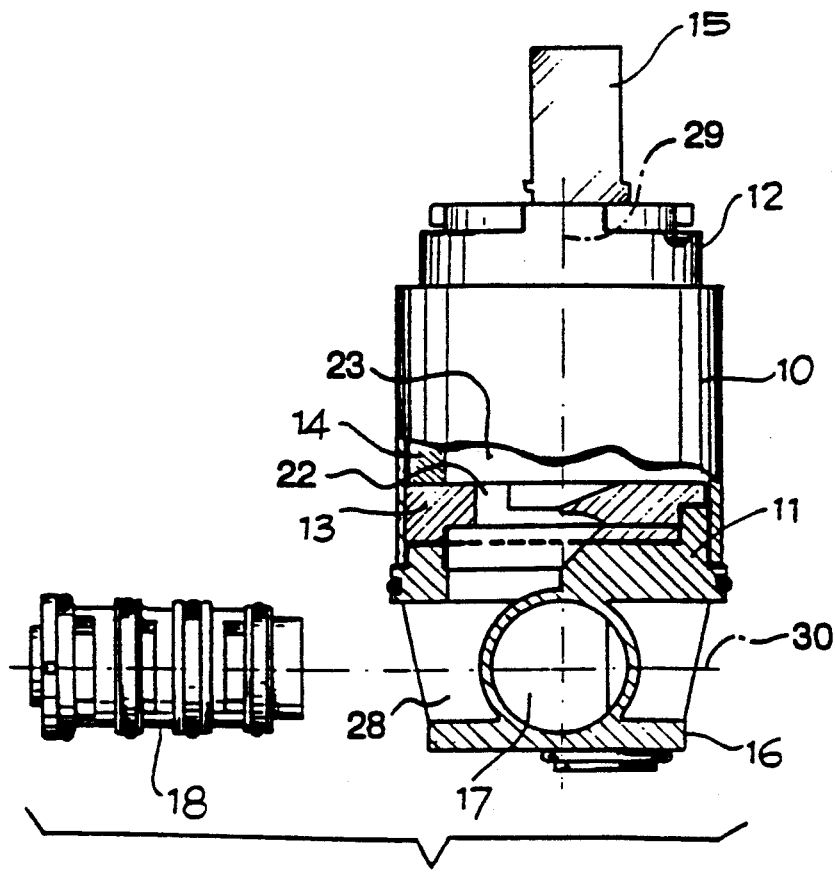
FIG. 1 is a partial section view of a mixer valve and of a separate pressure balancer.

The cartridge-type body 10 of the mixer valve has a base 11 and a lid 12. The base 11 can be integral with the body, and the lid 12 can be inserted and hooked to it or, on the contrary, the lid can be integral with the body and the base can be inserted. The body 10 has a longitudinal axis 29. In each case the body 10 holds a fixed plate 13 sealed to the base 11 and a mobile or movable plate 14 resting, and movable, on the fixed plate in a known way. Both fixed plate 13 and movable plate 14 are in a plane perpendicular to longitudinal axis 29. The mobile plate 14 is controlled through a lever 15 which is connected to, and guided oscillatingly, on the lid. The lever 15 extends from the body 10 along the longitudinal axis 29 of the body, and from a side of the movable plate 14 opposite the fixed plate 13. The fixed plate 13 has first and second inlet holes 20, 21 and an outlet hole 22. The mobile plate 14 has a mixing chamber 23 in communication with the outlet hole 22, and the mobile plate 14 is movable into communication with the first and second inlet holes 20, 21.

In accordance with the invention, the base 11 which is either integral, or inserted and hooked to the body 10, has an integral rise 16. The rise having a substantially cylindrical slot 17 designed to hold a pressure balancer 18. The slot 17 having a slot axis 30 substantially perpendicular to the longitudinal axis 19.

Figure 4:
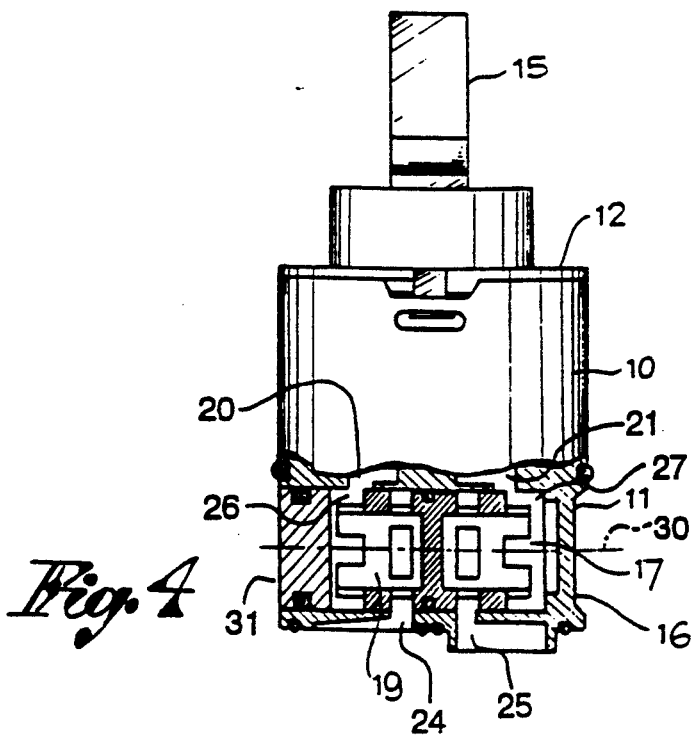
FIG. 4 is a section view of the cartridge-type body in FIG. 3 with the balancer.

The slot 17 has inlet passages 24, 25 for the inlet of water which are open towards two conduits (not shown) for supplying hot and cold water and joined to the base of the rise. The slot 17 also has outlet passages 26, 27 for the outlet of water which are open towards the plate-type mixer unit 13, 14 placed in the body. The inlet passages 24, 25 are positioned on a substantially opposite side of the slot 17 from the outlet passages 26, 27 as shown in FIG. 4. The rise 16, including the base 11, defines a delivery passage 28 which passes outside and around a portion of the rise defining the slot 17. The delivery passage 28 exits outward from the rise 16 in a direction perpendicular to the longitudinal axis 29 of the body and the slot axis 30. A panel 31 closes off the slot 17. The panel 31 is separately formed from the rise 16 and is positioned on a side of the rise 16 substantially parallel to the longitudinal axis of the body 10 as shown in FIG. 4.

The pressure balancer 18 has a structure and function which are already known and do not require particular attention.

Figure 2:
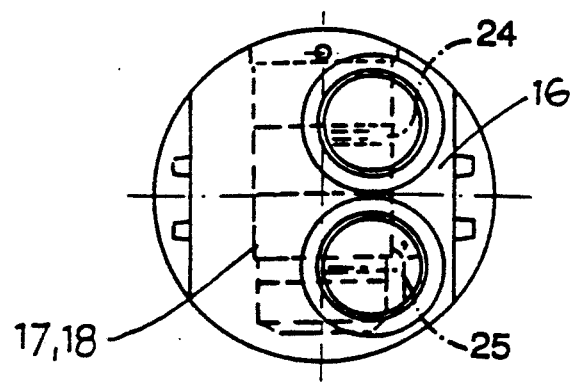
FIG. 2 is a view of the valve of FIG. 1 seen from the base.

The balancer 18 in the embodiment shown in FIG. 1 and 2 forms a separate unit in the form of a cartridge. This balancer 18 is inserted in the slot 17 in order to act as a balancer of the pressure of the water which goes through it before reaching the plate-type mixer unit 13, 14 and which water from there continues towards the delivery mouth of a tap. Thus, the slot 17 in such an embodiment only acts as a housing for the balancer 18.

Figure 3:
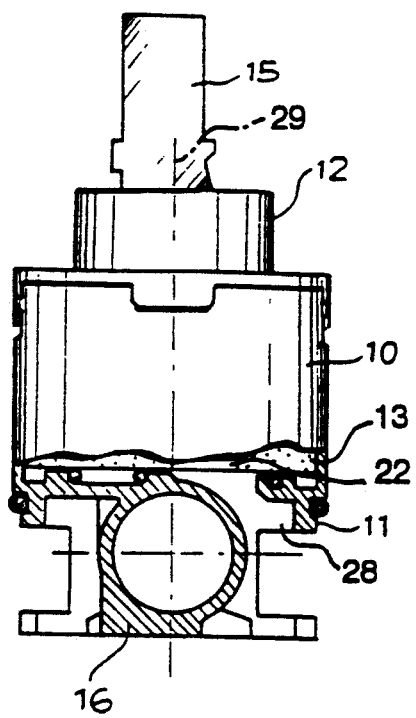
FIG. 3 is a variant where the slot in the cartridge-type body also acts as a body for the balancer.

On the other hand the slot 17 in the embodiment shown in FIGS. 3 and 4 also acts as the body or casing of the balancer 18. In this case the functional elements 19 of the balancer are assembled and coordinated between each other directly in the slot, therefore eliminating the external body or casing of the balancer itself when it forms an independent unit.

While specific embodiments of the invention have been shown and described in detail to illustrate the application of the principles of the invention, it will be understood that the invention may be embodied otherwise without departing from such principles.

I claim:
1. A mixer valve comprising:
   a body;
   a fixed plate rigidly mounted in said body, said fixed plate defining first and second inlet holes and defining an outlet hole;
   a movable plate mounted in said body and having means for moving with respect to said fixed plate, said movable plate defining a mixing chamber in communication with said outlet hole and movable into communication with said first and second inlet holes; and
   a base integrally connected to said body and on a side of said fixed plate substantially opposite said movable plate, said base including a rise integrally formed with said base and defining a slot means for receiving and containing a balancer, said rise defining inlet passages leading to said slot means and also defining outlet passages leading from said slot means to said fixed plate.
2. A valve in accordance with claim 1, wherein:
   said rise also defines a delivery passage leading toward a delivery mouth, and said delivery passage passing outside and around said slot means.
3. A valve in accordance with claim 1, wherein:
   said slot means is shaped to completely surround said balancer.
4. A valve in accordance with claim 1, further comprising:
   a balancer including a balancer case, said balancer and said balancer case being contained inside said slot means.
5. A valve in accordance with claim 1, wherein:
   said slot means includes a balancer case integral with said rise; and
   balancer components fitted and assembled inside said slot means.
6. A mixer valve comprising:
   a cartridge-type body with a longitudinal axis;
   a fixed plate rigidly mounted in said body in a plane substantially perpendicular to said longitudinal axis of said body, said fixed plate defining first and second inlet holes and defining an outlet hole;
   a movable plate mounted in said body and having means for moving with respect to said fixed plate, said movable plate being mounted in a plane substantially perpendicular to said longitudinal axis of said body, and said movable plate defining a mixing chamber in communication with said outlet hole and movable into communication with said first and second inlet holes;
   a lever connected to said movable plate and extending from said body along said longitudinal axis of said body from a side of said movable plate opposite said fixed plate;
   a base integrally connected to said body and on a side of said fixed plate substantially opposite said movable plate, said base including a rise integrally formed with said base and defining a substantially cylindrical slot means for receiving and containing a balancer, said substantially cylindrical slot means having a slot axis substantially perpendicular to said longitudinal axis of said body, said rise defining inlet passages leading to said slot means and also defining outlet passages leading from said slot means to said fixed plate, said outlet passages being positioned adjacent said fixed plate and on a side of said slot means substantially opposite said inlet passages, said inlet passages opening out of said rise on a side opposite said fixed plate.
7. A valve in accordance with claim 6, wherein:
   said rise also defines delivery passages, said delivery passages passing outside and around said slot means, and said delivery passages exiting outward from said rise in a direction substantially perpendicular to both said longitudinal axis of said body and to said slot axis.
8. A valve in accordance with claim 6, further comprising:
   a panel closing off said slot means and separately formed from said rise, said panel being positioned on a side of said rise substantially parallel to said longitudinal axis of said body.
9. A valve in accordance with claim 6, wherein:
   said fixed and movable plate are formed of ceramic.

* * * * *